United States Patent
Mori et al.

(10) Patent No.: US 7,506,351 B2
(45) Date of Patent: Mar. 17, 2009

(54) RECEIVING APPARATUS, PROGRAM NOTIFYING METHOD, RECORDING MEDIUM, AND PROGRAM WITH DETERMINATION OF WHETHER OR NOT IT IS SUITABLE FOR USER TO VIEW PROGRAM IN REAL TIME

(75) Inventors: Shigeki Mori, Saitama (JP); Keiichi Aoyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1343 days.

(21) Appl. No.: 10/180,119

(22) Filed: Jun. 27, 2002

(65) Prior Publication Data

US 2003/0033603 A1 Feb. 13, 2003

(30) Foreign Application Priority Data

Jul. 3, 2001 (JP) ............................. 2001-202652

(51) Int. Cl.
*G06F 3/00* (2006.01)
*G06F 13/00* (2006.01)
*H04N 5/445* (2006.01)

(52) U.S. Cl. ................................ 725/58; 725/9; 725/46

(58) Field of Classification Search .................. 725/38, 725/39, 46, 58, 88, 100, 108, 110, 112, 120, 725/122, 131, 139, 151, 9
See application file for complete search history.

(56) References Cited

U.S. PATENT DOCUMENTS 5,444,499 A * 8/1995 Saitoh ........................ 348/734
5,635,989 A * 6/1997 Rothmuller .................. 725/46
5,945,988 A * 8/1999 Williams et al. ............. 715/747
5,977,964 A * 11/1999 Williams et al. ............. 715/721
6,694,352 B1 * 2/2004 Omoigui ..................... 709/205
2002/0063797 A1 5/2002 Aratani et al.
2002/0112238 A1 * 8/2002 Kanojia et al. ............... 725/42
2002/0174430 A1 * 11/2002 Ellis et al. .................... 725/46
2005/0028208 A1 * 2/2005 Ellis et al. .................... 725/58
2005/0273819 A1 * 12/2005 Knudson et al. ............. 725/58

OTHER PUBLICATIONS

Mori, S. et. al.—U.S. Appl. No. 10/653,966.
Mori, S. et. al—U.S. Appl. No. 10/665,426.

* cited by examiner

*Primary Examiner*—John W. Miller
*Assistant Examiner*—John Schnurr
(74) *Attorney, Agent, or Firm*—Fitzpatrick, Cella, Harper & Scinto

(57) ABSTRACT

In a receiving apparatus which has an agent function of retrieving user's favorite programs, if there is a program, among the favorite programs, which should be viewed in real time, a user is notified of the program before the broadcast start time. For this purpose, the receiving apparatus is constituted by a receiving unit for receiving a broadcast signal, a retrieving unit for retrieving program information contained in the broadcast signal, and a communicating unit for notifying an external apparatus of information associated with a program detected by the retrieving unit predetermined time before the broadcast start time of the detected program.

4 Claims, 11 Drawing Sheets

FIG. 7

| | BSD01 | BSD03 | BSD05 | BSD07 |
|---|---|---|---|---|
| 5:00 | PROGRAM INFORMATION 11 | PROGRAM INFORMATION 31 | PROGRAM INFORMATION 51 | PROGRAM INFORMATION 71 |
| 6:00 | PROGRAM INFORMATION 12 | PROGRAM INFORMATION 32 | PROGRAM INFORMATION 52 | PROGRAM INFORMATION 72 |
| 7:00 | ⋯ | ⋯ | ⋯ | ⋯ |
| 8:00 | ⋯ | ⋯ | ⋯ | ⋯ |
| 9:00 | ⋯ | ⋯ | ⋯ | ⋯ |
| 10:00 | PROGRAM INFORMATION 16 | PROGRAM INFORMATION 36 | PROGRAM INFORMATION 56 | PROGRAM INFORMATION 76 |
| 11:00 | PROGRAM INFORMATION 17 | PROGRAM INFORMATION 37 | PROGRAM INFORMATION 57 | PROGRAM INFORMATION 77 |

MOVE WITH CURSOL BUTTON   VIEWING BOOKING WITH BLUE BUTTON   RECORDING BOOKING WITH GREEN BUTTON   ◁ 1/8 ▷

FIG. 8

| | REAL-TIME VIEWING HISTORY INFORMATION | FAVORITE INFORMATION A | PROGRAM INFORMATION A | ⋯ | TOTAL POINT |
|---|---|---|---|---|---|
| CORRECTION MULTIPLIER | 7 | 5 | 3 | ⋯ | — |
| PROGRAM 13 | 0 | 4 | 4 | ⋯ | 32 |
| PROGRAM 35 | 5 | 2 | 1 | ⋯ | 48 |
| PROGRAM 36 | 0 | 3 | 2 | ⋯ | 21 |
| PROGRAM 51 | 4 | 4 | 3 | ⋯ | 57 |
| PROGRAM 55 | 2 | 2 | 2 | ⋯ | 30 |
| PROGRAM 74 | 0 | 3 | 4 | ⋯ | 27 |

RECEIVING APPARATUS, PROGRAM NOTIFYING METHOD, RECORDING MEDIUM, AND PROGRAM WITH DETERMINATION OF WHETHER OR NOT IT IS SUITABLE FOR USER TO VIEW PROGRAM IN REAL TIME

BACKGROUND OF THE INVENTION

1. Field of the Invention

The present invention relates to a receiving apparatus for receiving a broadcast signal and, more particularly, to a receiving apparatus having an agent function of providing recommended programs to users.

2. Related Background Art

A conventional DTV apparatus designed to receive programs through digital broadcasting stores program service information accompanying digital broadcasts, as needed, and provides such information as an electronic program schedule. A user uses this schedule to make viewing booking, recording booking, and the like. A DTV apparatus having the so-called agent function has also been available, which is designed to retrieve user's favorite programs from the data of the above electronic program schedule on the basis of user's viewing history information and favorite information and present the programs to the user.

In this case, the agent function is the function of mainly extracting/recording the genre, keyword, and the like of a viewed program from program-related information, on the basis of favorite information input in advance by the user or user's viewing history information, for each day of the week and each time zone when the program is viewed, converting each item into a numerical value/properly weighting it on the basis of a repetitive viewing count or the like, performing retrieving operation of program-related information on the above electronic program schedule on the basis of such numerical information, and extracting a program that the user always views or user's favorite program for each day of the week and each time zone.

With regard to a program that seems to be habit-forming such as a program that the user views regularly every week, when the user is not viewing this program, the above agent function detects this and activates the recording function for the program, thereby compensating with the user's failure to view the program. With regard to a program that does not seem to be habit-forming but exhibits a high degree of matching in favorite information or a high degree of recommendation on the broadcasting station side, the agent function checks whether a program is a user's favorite program or not, and activates the recording function for this program, thereby compensating with the user's failure to view the program.

According to the above arrangement, however, a satisfactory result cannot be obtained by the above agent function, even if it activates the recording function, with respect to a program the viewing fun of which is reduced when it is recorded and viewed later, e.g., a serial TV drama which the user enjoys viewing every week with his/her family on a home DTV apparatus or sports broadcast the result of which the user wants to know in real time.

With the agent function, the user can know the existence of a program whose value resides in being viewed in real time as described above, and hence can perform viewing booking operation in the DTV apparatus. In this case as well, this operation is useless unless the user exists in the place where the DTV apparatus is installed, when the program for which the user has performed the viewing booking operation is broadcasted.

SUMMARY OF THE INVENTION

Under the circumstances, the present invention has been made to solve the above problems, and its object is to provide a receiving apparatus, program notifying method, recording medium, and program which can provide a user with a chance to reliably view, in real time, a program that is preferably viewed in real time, when an agent function retrieves user's favorite programs.

In order to achieve the above object, according to one aspect of the present invention, there is provided a signal receiving apparatus comprising receiving means for receiving a broadcast signal, retrieving means for retrieving program information contained in the broadcast signal, and communicating means for notifying an external apparatus of information associated with a program detected by the retrieving means predetermined time before the broadcast start time of the detected program.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a view showing an example of an EPG application displayed on the display screen of the DTV apparatus according to the first embodiment of the present invention;

FIG. 8 is a view for explaining arithmetic processing for the execution of retrieving and extracting functions based on the agent processing function according to the first embodiment of the present invention;

DETAILED DESCRIPTION OF THE PREFERRED EMBODIMENTS

The embodiments of the present invention will be described in detail below with reference to the accompanying drawings.

First Embodiment

Figure 1:
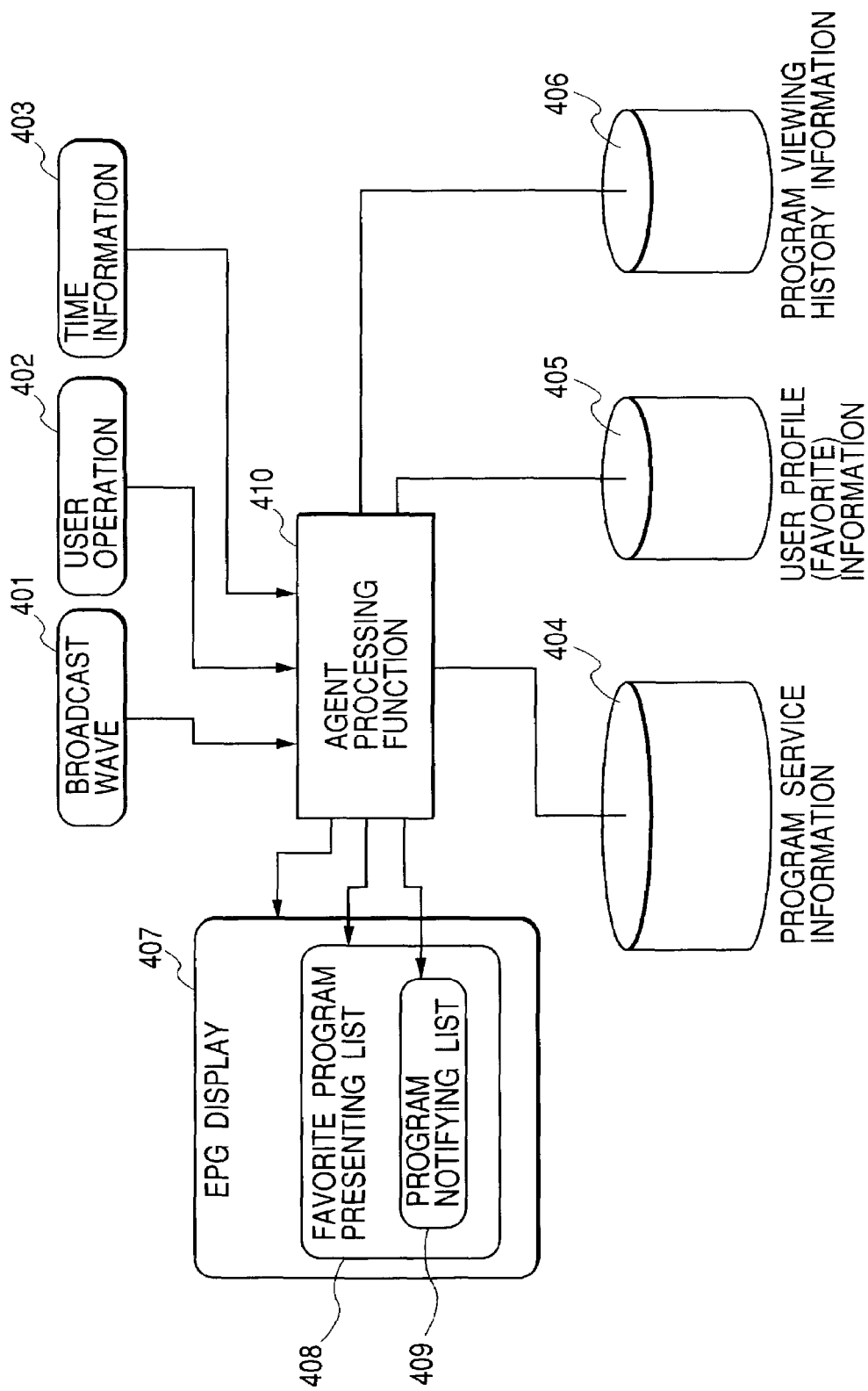
FIG. 1 is a functional block diagram showing a receiving apparatus according to the first embodiment of the present invention.

FIG. 1 is a functional block diagram which is most indicative of the characteristic features of a DTV apparatus according to the present invention. A agent processing function 410 can obtain information 401 to 403. The broadcast wave 401 contains program service information to be stored in a storage 404. With the information 402 as to an operation done by the user to the DTV apparatus, various user's favorite information input by the user are stored a storage 405. By using these information and the time information 403, program viewing history information to be stored in a storage 406, representing programs that the user actually viewed according to operation procedures is created.

The agent processing function 410 retrieves/extracts an electric program schedule, i.e., EPG (Electric Program Guide) display, on the basis of the information stored in the storages 404 to 406. A favorite program presenting list 408 is extracted as user's favorite programs from the EPG display 407. A program notifying list 409 is extracted as a list of programs demanding program notifying operation from the favorite program presenting list 408.

Figure 2:
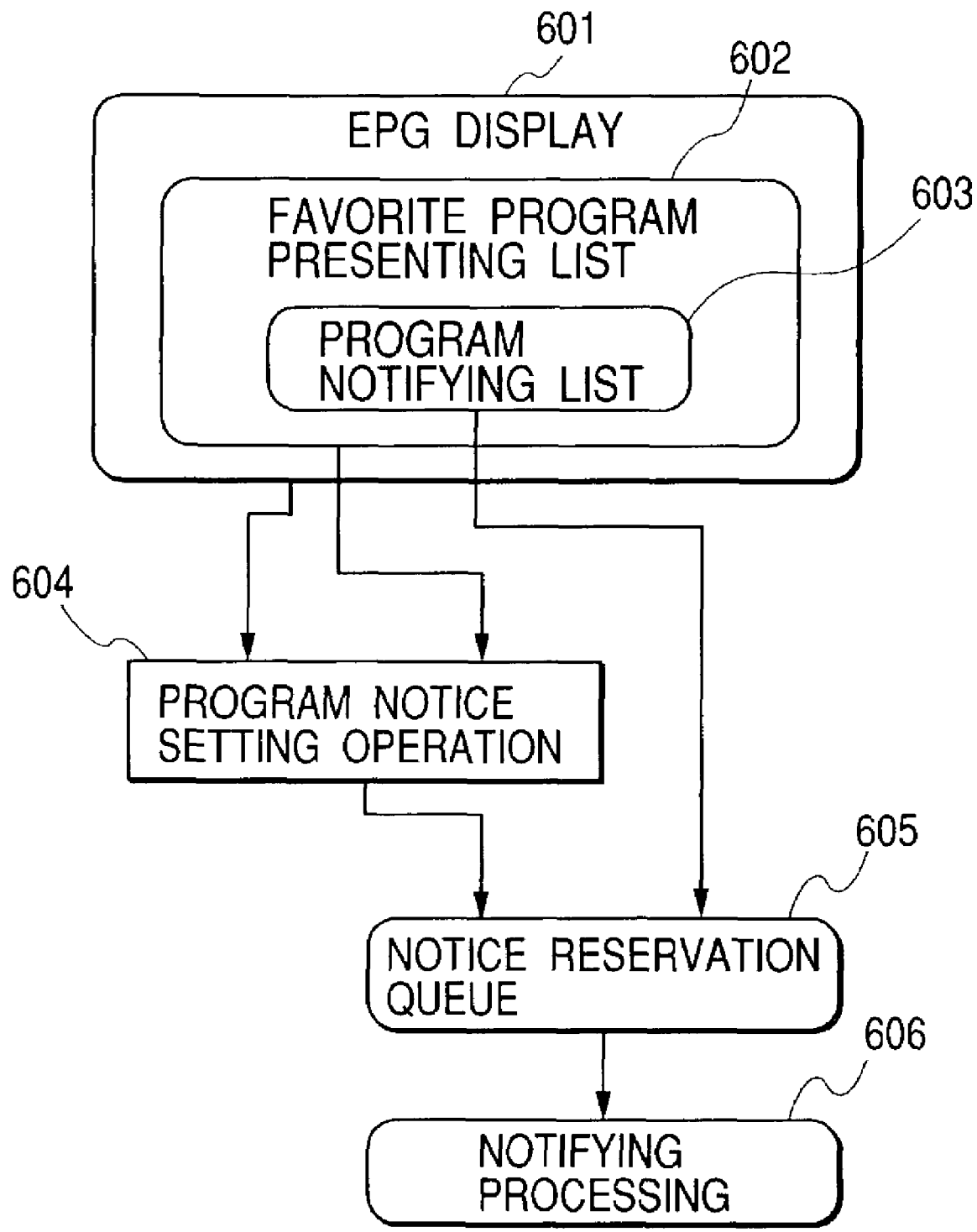
FIG. 2 is a functional block diagram showing the receiving apparatus associated with notifying processing according to the first embodiment of the present invention.

FIG. 2 is a functional block diagram for selection of information to be subjected to notifying processing in accordance with the retrieved/extracted information 407 to 409 in FIG. 1, i.e., the results of EPG display 601, favorite program presenting list 602, and program notifying list 603 in FIG. 2. Information in the program notifying list 603 is directly set into a notice reservation queue 605, and notifying processing 606 is performed, as needed. Information in the EPG display 601 and favorite program presenting list 602 are set into the notice reservation queue 605 through program notice setting operation 604 done by the user.

Figure 3:
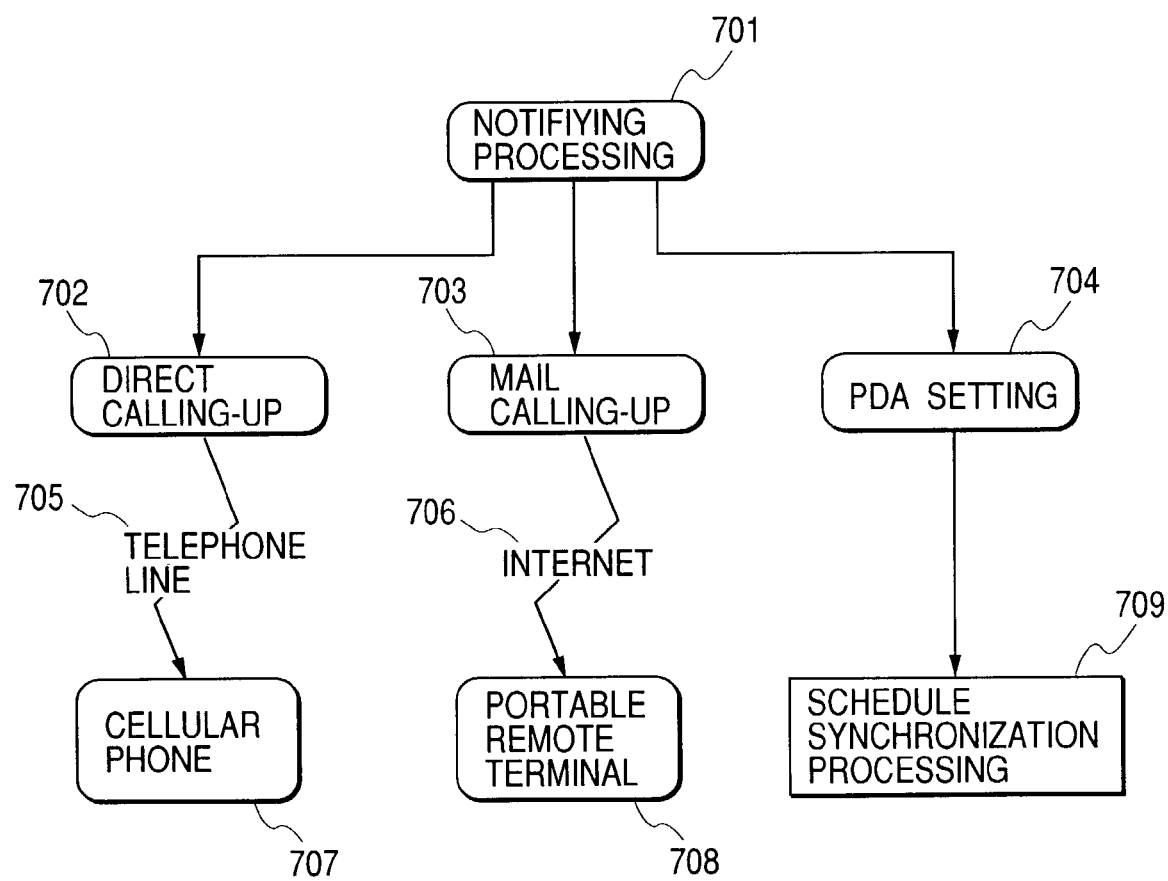
FIG. 3 is a functional block diagram showing the receiving apparatus associated with processing after the notifying processing according to the first embodiment of the present invention.

FIG. 3 is a functional block diagram for explaining operations in three patterns after the notifying processing in FIG. 2. In case of direct calling-up 702, information is directly notified to a cellular phone 707 held by the user through a telephone line 705. In case of mail calling-up 703, the apparatus connects to the Internet through a telephone line, radio channel, or CATV and notifies information to the portable terminal held by the user through a chat system and electronic mail protocol. In case of PDA setting 704, if a link that can communicate and synchronize with a PDA is prepared, a file for setting a scheduling function with an alarm for the PDA is created, and the PDA performs synchronization processing between the DTV apparatus and the scheduling function with the alarm, thereby notifying information through the scheduler of the PDA at the timing when the DTV apparatus performs notifying processing.

Figure 4:
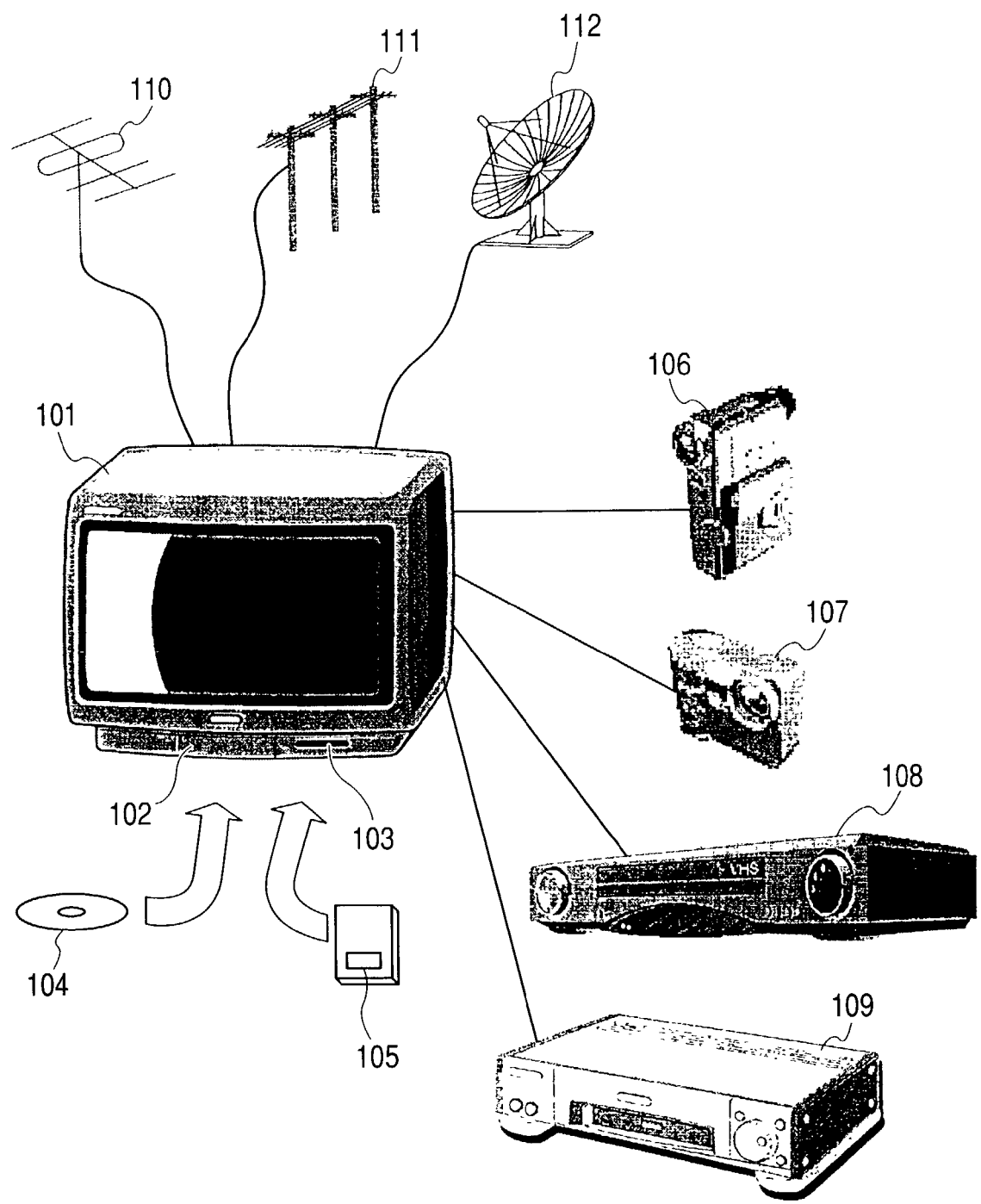
FIG. 4 is a perspective view of a DTV apparatus according to the first embodiment of the present invention.

FIG. 4 is a perspective view of the DTV apparatus according to the present invention. Around the main body of a DTV apparatus 101 (including 102 and 103), the following components are shown: various video apparatuses such as a VTR apparatus and DV apparatus connected to the DTV apparatus, an audio apparatus, and various media (104 to 112 in FIG. 4) represented by a memory card device and DVD which can record/play back stored information when they are inserted into the DTV apparatus.

Figure 5:
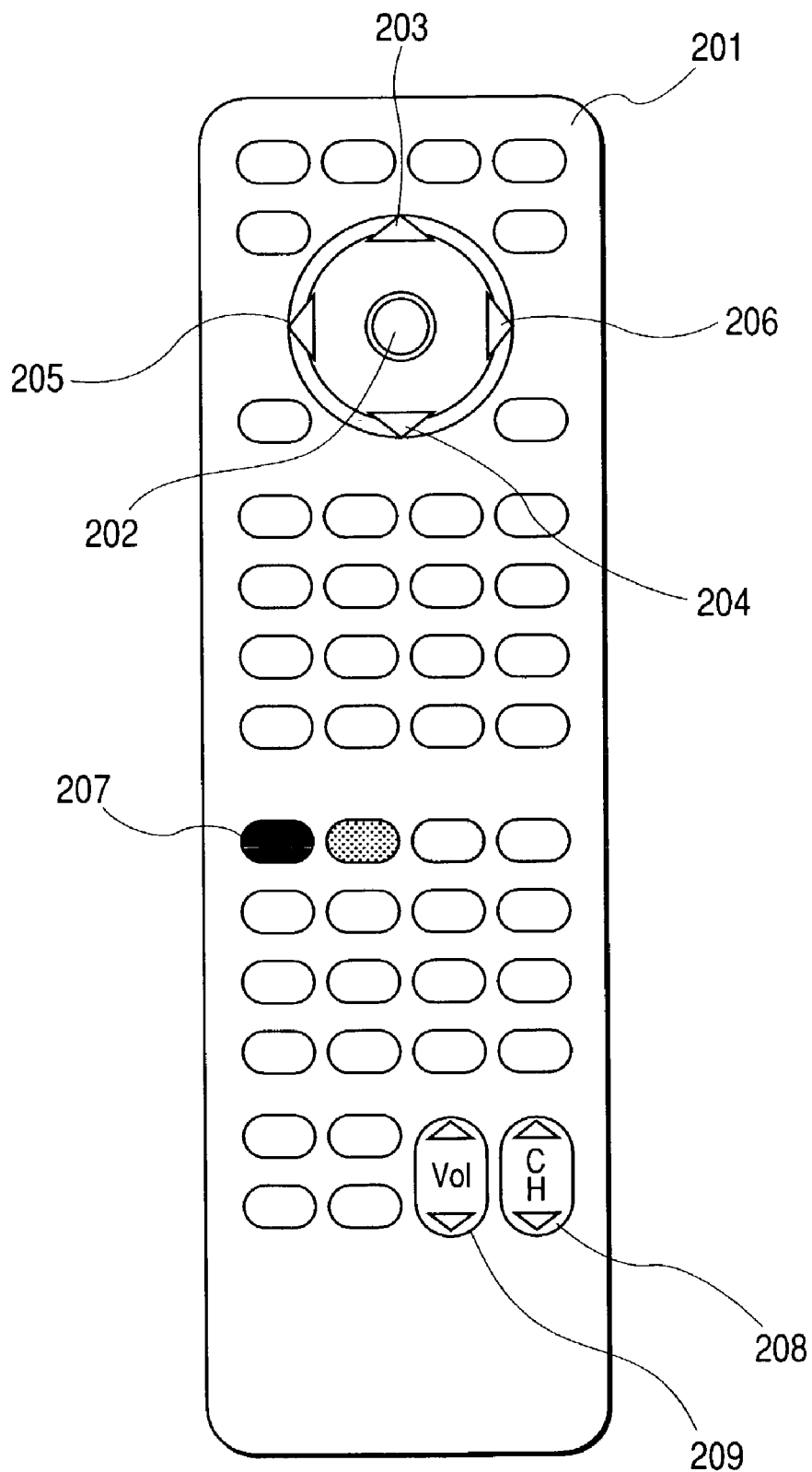
FIG. 5 is a view showing the outer appearance of a remote controller for operating the DTV apparatus according to the first embodiment of the present invention.

FIG. 5 shows a remote controller for operating the DTV apparatus. A remote controller body 201 includes up, down, left, right move buttons 203 to 206 for operating various setting menu windows on the DTV apparatus, an execution button 202 located at a central position, a color button 207 used for data broadcasting at the time of digital broadcasting, a channel up/down button 208 for increasing/decreasing the channel number, and an up/down button 209 for controlling the sound volume of the DTV apparatus.

Figure 6:
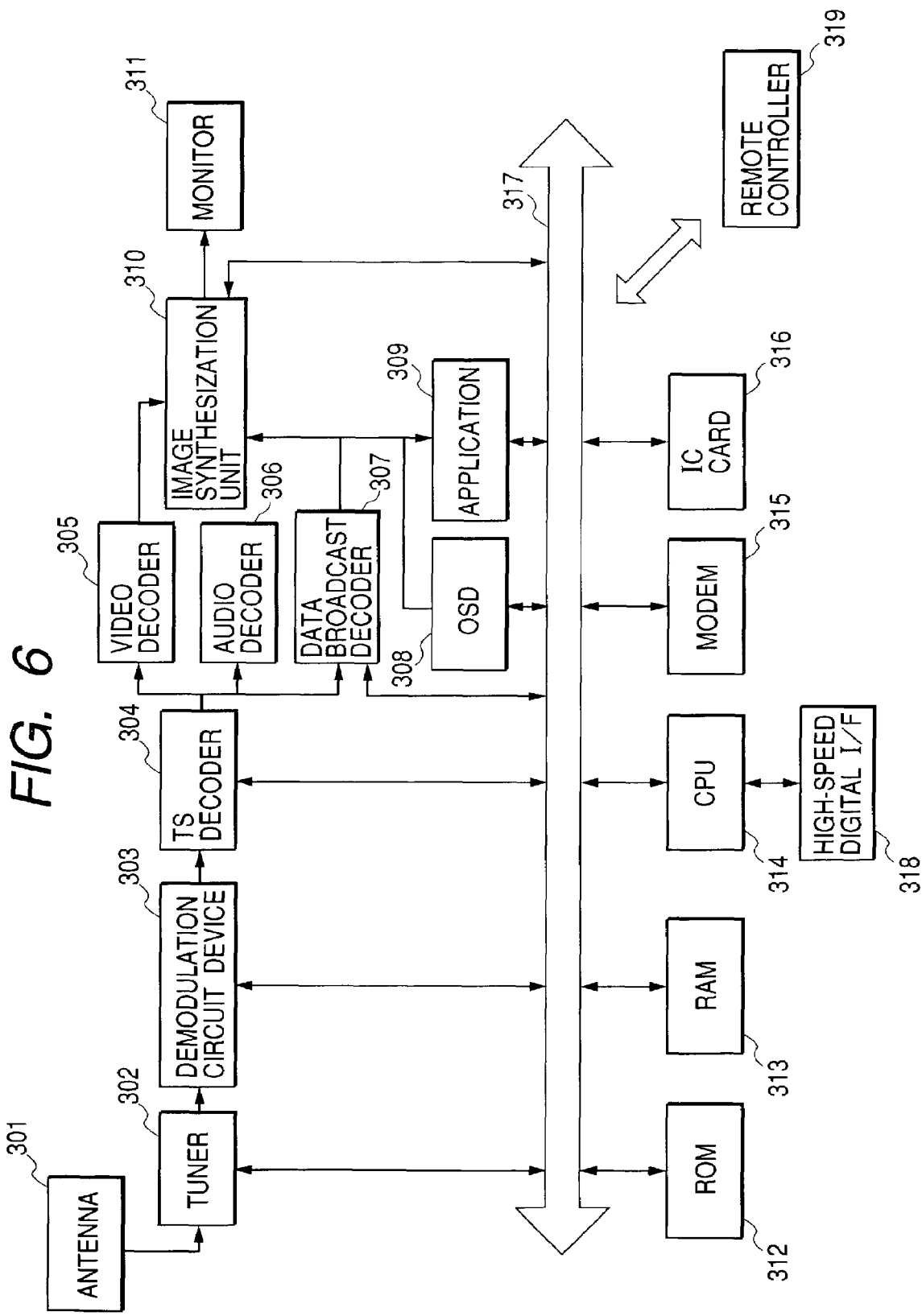
FIG. 6 is a block diagram showing the internal arrangement of the DTV apparatus according to the first embodiment of the present invention.

FIG. 6 is a block diagram showing the internal arrangement of the DTV apparatus according to the present invention. An antenna 301 is used to receive a digital broadcast wave. A tuner 302 performs channel selection and tuning on the basis of the electric wave received through the antenna 301. A demodulation circuit device 303 demodulates the electric wave having undergone channel selection into a signal. A TS decoder 304 separates a TS (Transport Stream) signal from the demodulated signal. A video decoder 305 decodes the separated TS signal into video data. An audio decoder 306 decodes the TS signal into audio data. A data broadcast decoder 307 decodes the TS signal into data for data broadcasting. An OSD circuit 308 displays information from various controllers of the DTV apparatus body. Various applications 309, e.g., an EPG and agent processing function, are installed in the DTV apparatus. An image synthesization unit 310 synthesizes various video information created inside the DTV apparatus, and outputs the resultant information. A monitor 311 serves as the display screen of the DTV apparatus. A ROM 312 is used to store programs for various control operations for the DTV apparatus, installed application programs, and various data. A RAM 313 is used to store programs for various control operations for the DTV apparatus, installed application programs, and various data, and serves as a work area where the applications are operated. A CPU 314 executes various control operations for the DTV apparatus and applications. A modem 315 is used for communication between the DTV apparatus and an external device. An IC card 316 is used for authenticating operation in performing limited receiving operation in the DTV apparatus or for the exchange of various information with an external device. A bus unit 317 is used for the transfer of information between the respective circuit blocks of the DTV apparatus. A high-speed digital I/F 318 is used for high-speed exchange of data including image data with an external device connected to the DTV apparatus. A remote controller 319 serves to transfer various commands to the DTV apparatus.

FIG. 7 is a view showing a display window on the DTV apparatus on which the EPG application installed in the DTV apparatus is displayed. This window includes an operation guide 801 which is displayed as needed, a page move button 802, a channel name 803, a broadcasting time 804, and program information 805 comprising a program name and program details.

FIG. 8 is a view for intelligibly explaining arithmetic processing for allowing the agent processing function 410 in FIG. 1 to perform retrieval and extraction processing on the basis of the information stored in the storage 404 to 406. A program name list 507 is extracted as a user's favorite program presenting list. Each of the numerical values from 0 to 5 in a column 501 represents the frequency with which the user viewed a program with the same program name, a series program, or a program broadcasted in the same time zone on the same channel in real time in the past. Each of the numerical values from 0 to 5 in a column 502 represents the matching degree between the program-related information of the program service information stored in the storage 404 and the user profile (favorite) information 405 registered in advance. Each of the numerical values from 0 to 5 in a column 503 represents the degree of coincidence between the matching degree between the program-related information of the stored program service information 404 and program information keywords registered in advance, which degree indicates whether the program contains a word that suggesting the program seems to be a special event or a program should be viewed in real time. A column 504 is set on the assumption that there are plurality of items associated with the columns 502 and 503. In this case, however, this column is omitted for the sake of simplicity. Each of the numerical values in a column 505 is the total point obtained by adding the products of the numerical values in the columns 501 to 504 and correction multipliers 506 for each program. In this case as well, all the numerical values in the item in the column 504 are omitted by setting them to 0.

Figure 9A:
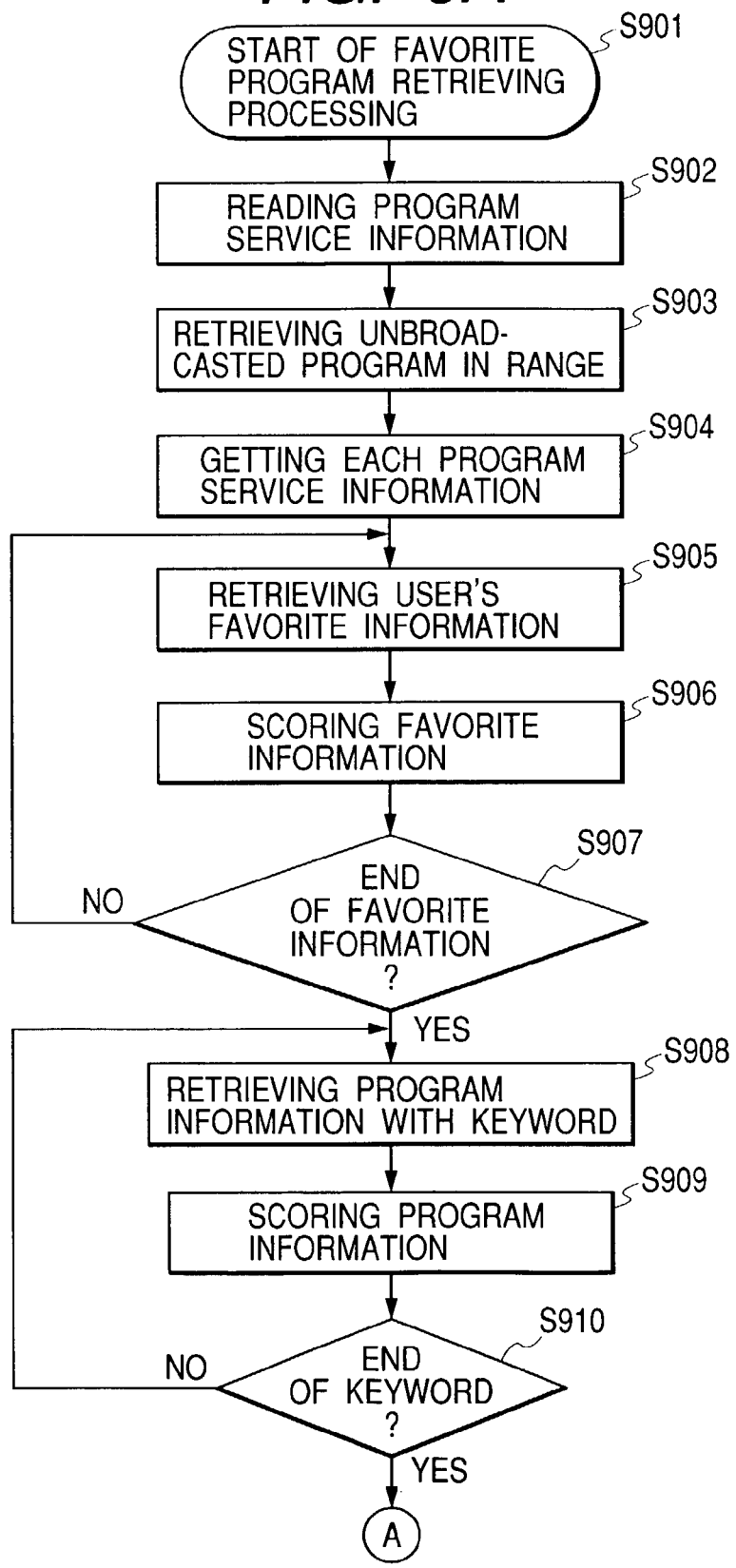
FIG. 9 which is composed of FIGS. 9A and 9B are flow charts showing operation to be performed by the agent processing function of the DTV apparatus according to the first embodiment of the present invention when a request to extract a favorite program or a program that needs to be notified is generated.
Figure 9B:
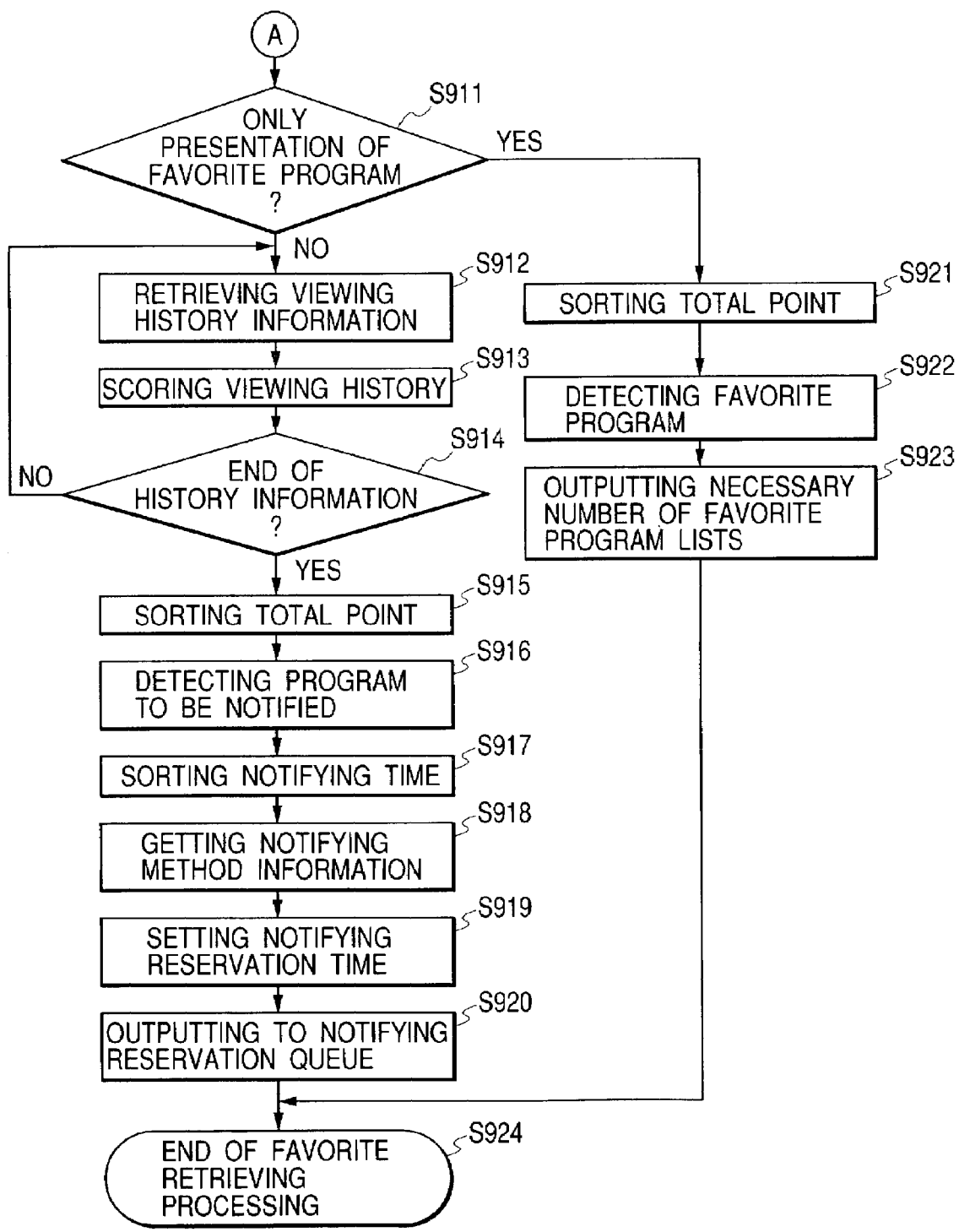

FIG. 9 is a flow chart showing operation to be performed when the agent processing function of the DTV apparatus is requested to extract favorite program or a program that needs to be notified. In step S902, the agent processing function reads program service information within the requested favorite program extraction range from sequentially stored program service information.

In step S903, unbroadcasted data is retrieved from the read program service information. In step 904, the data is divided into program service information for each program, and each divided information is stored. In step S905, each program service information is retrieved in accordance with the user's favorite information in the column 502 in FIG. 8. In step S906, the matching degree is scored on the basis of the retrieval result.

In step S907, it is checked whether all program candidates are completely scored. If NO in step S907, the flow returns to step S905. If YES in step S907, the flow advances to step S908 to retrieve each program service information on the basis of a program information keyword registered in advance as a word that makes the program seem to be a special event or a program that should be viewed in real time, which is used in the column 503 in FIG. 8. In step S909, the matching degree is scored on the basis of the retrieval result.

In step S910, it is checked whether all the program candidates are completely scored. If NO in step S910, the flow returns to step S908. If YES in step S910, the flow advances to step S911 to check whether the requested item is the presentation of a favorite program. If YES in step S911, the flow advances to step S921 to sort the points obtained so far, i.e., the total points based on the numerical values in the columns 502 and 503 in FIG. 8. In step S922, favorite programs are detected in the decreasing order of total points until the requested number of favorite programs are obtained. In step S923, the necessary number of programs are output as a favorite program list.

If it is determined in step S911 that this favorite program retrieving processing is to be done for notifying processing, the flow advances to step S912 to retrieve history information indicating whether a given program was viewed in real time. In step S913, the matching degree is scored on the basis of the retrieval result. In step S914, it is checked whether all the program candidates are completely scored. If NO in step S914, the flow returns to step S912.

If YES in step S914, the flow advances to step S915 to sort all the points obtained so far, i.e., the total points based on the numerical values in the columns 501, 502, and 503 in FIG. 8. In step S916, programs that need to be notified are detected depending on whether each total point exceeds a predetermined value. In step S917, the detected programs that need to be notified are sorted in the order of broadcasting time. In step S918, notifying method information set by the user is acquired. In step S919, a time a predetermined period of time before the broadcast start time of each program that needs to be notified is set as a notifying time. In step S920, the corresponding information is then output to an execution queue with respect to a means for actually performing notifying processing.

The first embodiment of the present invention will be described in detail below with reference to FIGS. 1 to 9. Assume that in the DTV apparatus according to the present invention, program service information which is information related to programs sent through various broadcasting media and communication means such as terrestrial broadcasting, a CATV, the Internet, and satellite broadcasting represented by the media 110 to 112 in FIG. 4 is acquired every day or at specific time intervals.

This program service information is used for an electronic program guide like the one shown in FIG. 7, i.e., an electronic program schedule, in the DTV apparatus. The electronic program schedule displays a list of program-related information, e.g., program names on the respective channels, genre information, broadcasting times, and program guides. When the user selects a specific program by using the remote controller of the DTV apparatus and performs an operation in accordance with the operation guide displayed on the display screen of the DTV apparatus, he/she can easily set viewing booking, recording booking, or the like of the selected program.

A DTV apparatus having a favorite program function of retrieving and presenting a user's favorite program, in particular, is equipped with a function, generally called the agent function, which infers a user's favorite program from programs to be broadcasted in the future, which are stored as program-related information, on the basis of keyword information associated with user's preferences input by the user in advance or user's viewing tendency information obtained from a daily viewing history, information associated with the programs that the user viewed, and the like, and presents the inferred program to the user.

These agent functions mainly perform scoring on the basis of the degrees of matching obtained by retrieving keywords from program service information provided together with broadcast waves and stored, change necessary keywords in accordance with the respective application purposes, weight the obtained points as needed, and add the resultant points, thereby obtaining a target result on the basis of characteristics represented by the points after addition. With regard to retrieval of ambiguous information such as user's favorite programs, therefore, although reliable results cannot be obtained, results with which the user is almost satisfied can be obtained on the basis of a plurality of keywords, habitual tendency concerning viewing times, designated genres, and the like.

Assume that in the DTV apparatus, a request to provide a today's favorite program is generated by timer processing in the apparatus while the user is sleeping in bed. In this case, favorite program retrieving processing is started in step S901 in FIG. 9. In steps S902 and 903, program service information about programs to be broadcasted today is read from the stored program service information 404 in FIG. 1. In step S904, the read program service information is divided into information about each program.

In step S905, retrieving is performed with respect to each program on the basis of keywords which is the user profile (favorite) information 405 in FIG. 1. As a result, in step S906, each retrieval result is scored in accordance with the degree of matching, e.g., complete matching or partial matching, and the resultant point is weighted by a correction multiplier set in consideration of the importance of favorite information, thereby completing final scoring.

When all the programs are scored in steps S907 to S905, scoring associated with a program information keyword is performed in the same manner as described above. The program information keyword in this case is a keyword that is not registered by the user in advance but is used to identify the program which is a special one, e.g., a big event of the century or memorial program.

It is checked in step S911 whether the request is a request for only presentation of a favorite program. In this case, in order to detect a program to be notified, the flow advances to step S912, in which past program information is retrieved to indicate whether each target program is the same program as that broadcasted in the past or a series program, depending on the title, broadcasting time zone, and the like. In step S913, each program is scored on the basis of the percentage at which the user viewed the program in real time, and the resultant point is then weighted by a correction multiplier set in consideration of the importance of the corresponding item, thereby completing final scoring.

Subsequently, scoring is completed in the loop of steps S912 to S914. At this time, retrieval based on each information is generally done with many keywords. However, for the sake of simplicity, a description of this operation will be omitted. In addition, each correction multiplier should be changed as needed on the basis of the importance of each retrieval keyword for each purpose of a retrieval instruction.

In this embodiment, however, each correction multiplier is fixed for the same reason.

In this embodiment, since retrieval is performed for the purpose of notifying processing, the correction multiplier by which the point based on the percentage at which a given program was viewed in real time is multiplied is set to be especially large. As a consequence, in the case shown in FIG. 8, when programs 13 and 51 are compared, program 13 higher in the points based on favorite information and program information was hardly viewed in real time and was often viewed through another means such as recording, and hence is much lower in the point based on real-time viewing history information than program 51. Likewise, program 35, which is low in the points based on favorite information and program information, is habitually viewed in real time, and hence scores high in this case.

In step S915, the programs are sorted according to the total points 505. In step S916, programs having points exceeding the value "40" are detected as programs that need to be notified. In the case shown in FIG. 8, programs 35 and 51 correspond to such programs. In step S917, the programs that are detected as those which need to be notified are sorted according to the start times of the broadcasting of the respective programs to be placed in the order of earlier start times of broadcasting.

In step S918, information about a specific notifying means set by the user in advance, like that shown in FIG. 3, is acquired. In step S919, information as to when the notifying should be performed before the broadcast start time, which is set by the user in advance, is acquired. In step S920, the notifying information about each program to be notified is stored in the notice reservation queue 605 which is a notice reservation wait in FIG. 2, and the favorite program retrieving processing is terminated. Setting of a terminal to which information is to be notified and setting of a notifying time will be briefly described below. These settings can be done by operating the remote controller 201. More specifically, the user sets, for example, the type of terminal or mail address to which information is to be notified in FIG. 3 on a menu window. In addition, the user sets information indicating the notifying time which is preceding to the broadcast start time by a specific period of time for each terminal.

Subsequently, the information to be notified which is stored in the notifying reservation queue is notified at the notifying time by the preset method, as shown in FIG. 3. As described above, according to this embodiment, when detecting a user's favorite program, the DTV apparatus performs retrieval and scoring in consideration of the user's real-time viewing history information. With regard to a program which the user habitually views in real time on the DTV apparatus, the user can be directly notified of the start of the program a specific period of time before the broadcasting time. This makes it possible for the user to reliably view a serial program which the user enjoys viewing in real time, or a special event program.

Second Embodiment

The system according to the first embodiment is designed to notify the user of the start of a program a predetermined period of time before the broadcast start time of the program.

Figure 10:
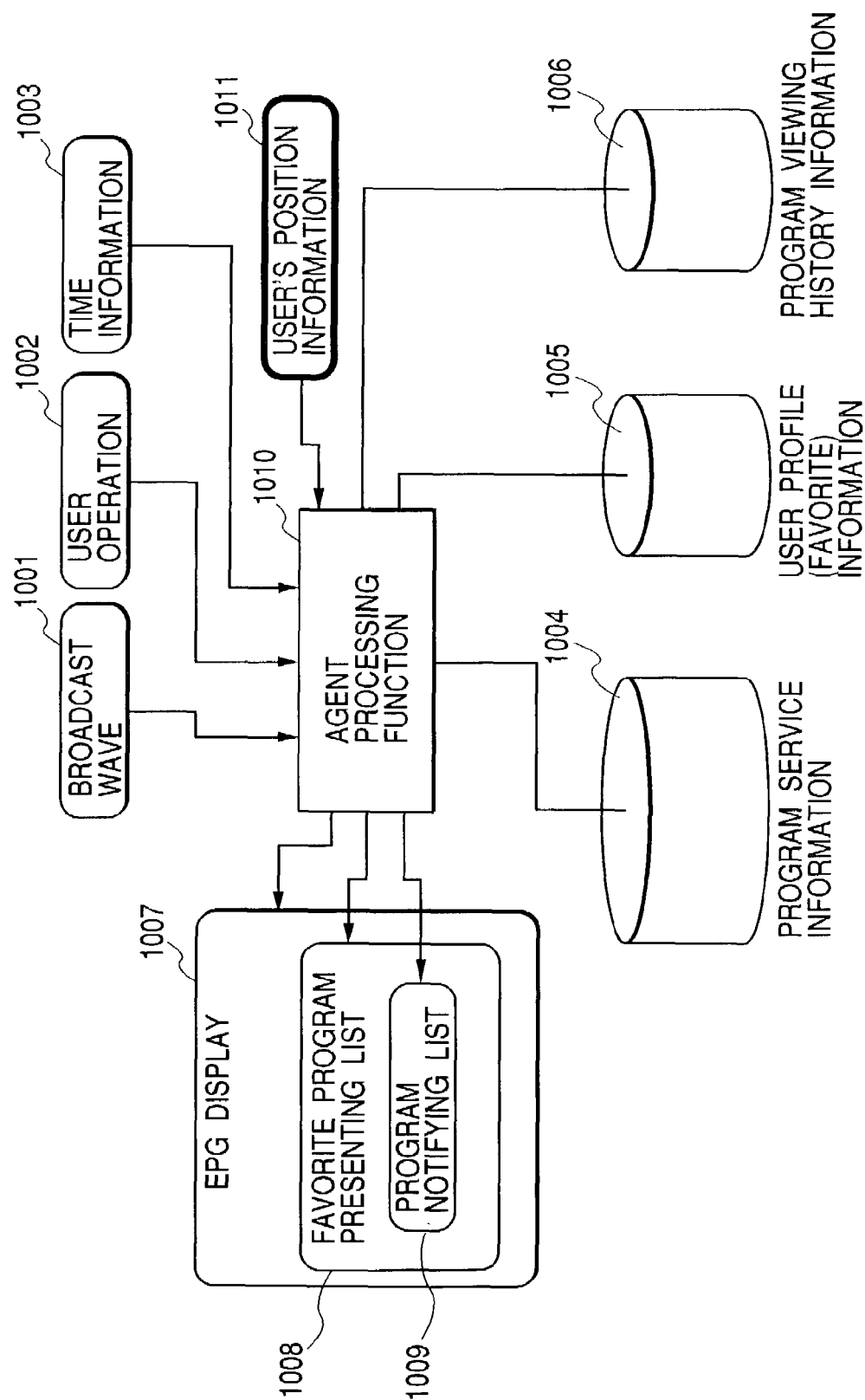
FIG. 10 is a functional block diagram showing a receiving apparatus according to the second embodiment of the present invention.

In contrast to this, as shown in FIG. 10, this embodiment includes a means for periodically checking the current user's position, and a means for calculating the distance from the position of the DTV apparatus to the position of the user, and notifying the user of the start of a program upon changing a preset notifying time to an earlier time if the distance exceeds a predetermined value.

As a method of checking the current position of the user, a service using radio communication and radio base stations, which is executed for terminals such as cellular phones carried by users, is known. A system based on a combination of a GPS (Global Positioning System) apparatus and radio communication equipment has also been in practice. Either of these systems has already been in practice as a service allowing users to obtain information through the Internet. The DTV apparatus can periodically check the current position of the user by using these services.

Even in case of that the user visits some place or taken a business trip so that the position of the user is currently farther than his/her office, and that in standard setting, the program notifying operation of the DTV apparatus is performed one hour before the broadcast start time assuming that the user stays in the office during daytime and the time taken to go home is one hour in consideration of variations in commuting time, the user can reliably view the program by performing program notifying operation at an earlier timing than normal.

Assume that the user visits some place and cannot go home before the broadcast start of a given program in spite of the fact that program notifying operation is done at an earlier timing. In this case, this embodiment may be designed to allow the user to instruct the DTV apparatus to record the program from a terminal such as a cellular telephone or PDA which performs the notifying operation. More specifically, for example, referring to FIG. 3, upon reception of a program notification from the DTV apparatus, the portable terminal 708 displays corresponding information on the built-in display unit, together with the icons of "OK" and "record". When the user comprehends it and terminates the processing, he/she operates the icon of "OK". If the user thinks that he/she cannot go home before the broadcast start of the program, and wants to record it, he/she operates the icon of "record". The portable terminal then instructs the DTV apparatus to record the currently notified program.

The present invention also incorporates the following arrangement within its category. In this arrangement, in order to operate various devices so as to realize the functions of the above embodiments, the program codes of software for realizing the functions of the above embodiments are supplied to a computer in an apparatus or system connected to the respective devices, thereby operating the devices in accordance with programs stored in the computer (CPU or MPU) in the system or apparatus.

In this case, the program codes of the software themselves realize the functions of the above embodiments, and the program codes themselves and a means for supplying the program codes to the computer, e.g., a recording medium in which the program codes are stored, constitute the present invention. As a recording medium storing such program codes, a flexible disk, hard disk, optical disk, magnetooptical disk, a CD-ROM, a magnetic tape, nonvolatile memory card, a ROM, or the like can be used.

It is obvious that the above program codes are included in the embodiments of the present invention not only in a case wherein the functions of the above embodiments are realized when the computer executes the supplied program codes but also in a case wherein the functions of the above embodiments are realized by the program codes in cooperation with the OS (Operating System), another application software, or the like running on the computer.

It is also obvious that the present invention incorporates a case wherein the supplied program codes are stored in the memory of a function expansion board inserted into the computer or a function expansion unit connected to the computer, the CPU of the function expansion board or function expansion unit performs part or all of actual processing on the basis of the instructions of the program codes, and the functions of the above embodiments are realized by the processing.

As is obvious from the above description, according to the present invention, when notifying a user's favorite program, by notifying the user of a program that the user habitually views or is very interested in viewing in real time, before the broadcast start of the program, the user can reliably view the program in real time.

Many widely different embodiments of the present invention may be constructed without departing from the spirit and scope of the present invention. It should be understood that the present invention is not limited to the specific embodiments described in the specification, except as defined in the appended claims.

What is claimed is:

1. A broadcast receiving apparatus, which receives a broadcast signal and extracts program information included in the received broadcast signal to store the extracted program information in a store unit, wherein the program information is information related to a program scheduled to be broadcasted in the future and obtained in advance prior to broadcasting of the scheduled program, said apparatus comprising:

an extraction unit, which searches the program information stored in the store unit to extract a program scheduled to be broadcasted in the future, which appears to be suitable for a user's preference, from the program information stored in the store unit, on the basis of preference information of a user who is a viewer of a program;

a determination unit, which determines whether or not it is suitable for the user to view in real time the program extracted by said extraction unit, by using viewing history information of the user prior to the broadcasting of the extracted program, wherein said determination unit uses the viewing history information to determine a percentage of past real-time viewing;

a transmission unit, which transmits notification information for notifying the user of the program suitable for the real-time view, to an external apparatus being capable of communicating with said broadcast receiving apparatus, prior to broadcasting of the program, in a case where said determination unit determines that it is suitable for the user to view in real time the extracted program;

a setting unit, which receives information of the external apparatus to which said transmission unit transmits the notification information, and a setting input of information for a transmission timing of the notification information; and a detection unit, which detects a position at which the external apparatus is located, wherein said transmission unit transmits the notification information in accordance with the information received by said setting unit and changes the transmission timing of the notification information, received by said setting unit, in accordance with the position of the external apparatus, detected by said detection unit.

2. An apparatus according to claim 1, further comprising a processing unit, which discriminates a setting requirement for presenting the program extracted by said extraction unit and a setting requirement for transmitting the notification information for notifying the external apparatus of the program determined by said determination unit, and determines whether to perform a determination processing of the extracted program by said determination unit, on the basis of a result of discrimination of the setting requirements.

3. A program notification method for a broadcast receiving apparatus, which receives a broadcast signal and extracts program information included in the received broadcast signal to store the extracted program information in a store unit, the program information being information related to a program scheduled to be broadcasted in the future and obtained in advance prior to broadcasting of the scheduled program, said method comprising the steps of:

searching the program information stored in the store unit to extract a program scheduled to be broadcasted in the future, which appears to be suitable for a user's preference, from the program information stored in the store unit on the basis of preference information of a user who is a viewer of a program;

determining whether or not it is suitable for the user to view in real time the program extracted in said extraction step, by using viewing history information of the user prior to the broadcasting of the extracted program, wherein said determining step uses the viewing history information to determine a percentage of past real-time viewing;

transmitting notification information for notifying the user of the program suitable for the real-time view, to an external apparatus being capable of communicating with said broadcast receiving apparatus, prior to broadcasting of the program, in a case where said determination step determines that it is suitable for the user to view in real time the extracted program;

a setting step of receiving information of the external apparatus to which said transmission step transmits the notification information, and a setting input of information for a transmission timing of the notification information; and a step of detecting a position at which the external apparatus is located, wherein said transmission step transmits the notification information in accordance with the information received in said setting step and changes the transmission timing of the notification information, received in said setting step, in accordance with the position of the external apparatus, detected in said detection step.

4. A method according to claim 3, further comprising a step of discriminating a setting requirement for presenting the program extracted in said extraction step and a setting requirement for transmitting the notification information for notifying the external apparatus of the program determined in determining step, and determining whether to perform a determination processing of the extracted program in said determination step, on the basis of a result of discrimination of the setting requirements.

* * * * *